Dec. 10, 1957  J. H. SCHAEFER  2,815,828
AUTOMATIC TRACTION DEVICE FOR AUTOMOBILES
Filed Sept. 16, 1955  3 Sheets-Sheet 1
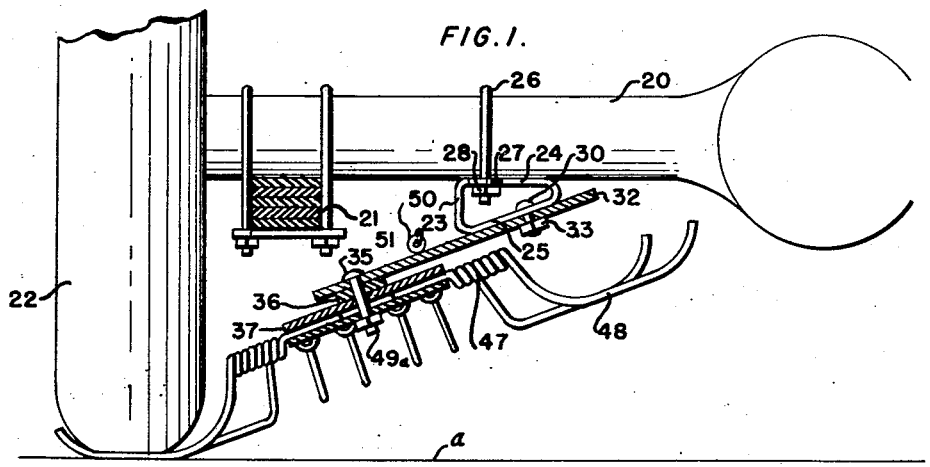
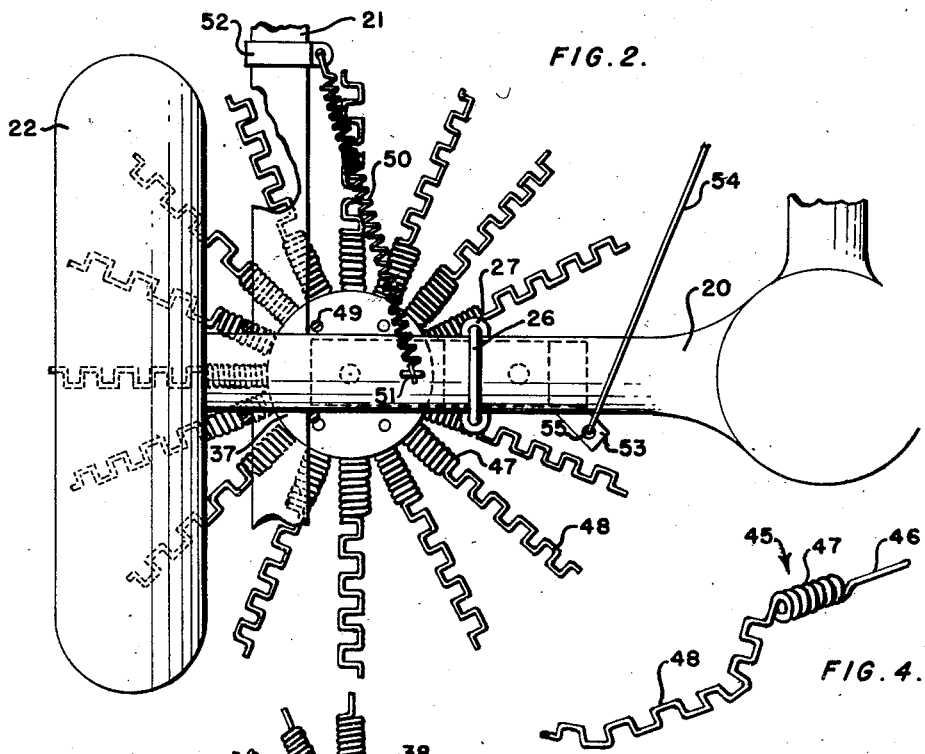
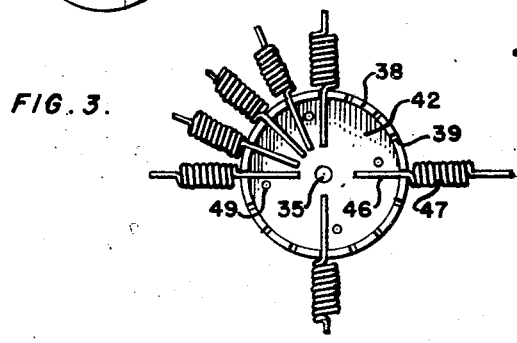
INVENTOR.
JOHN HENRY SCHAEFER
BY
Patrick D. Beavers
ATTORNEY Dec. 10, 1957  J. H. SCHAEFER  2,815,828
AUTOMATIC TRACTION DEVICE FOR AUTOMOBILES
Filed Sept. 16, 1955  3 Sheets-Sheet 2
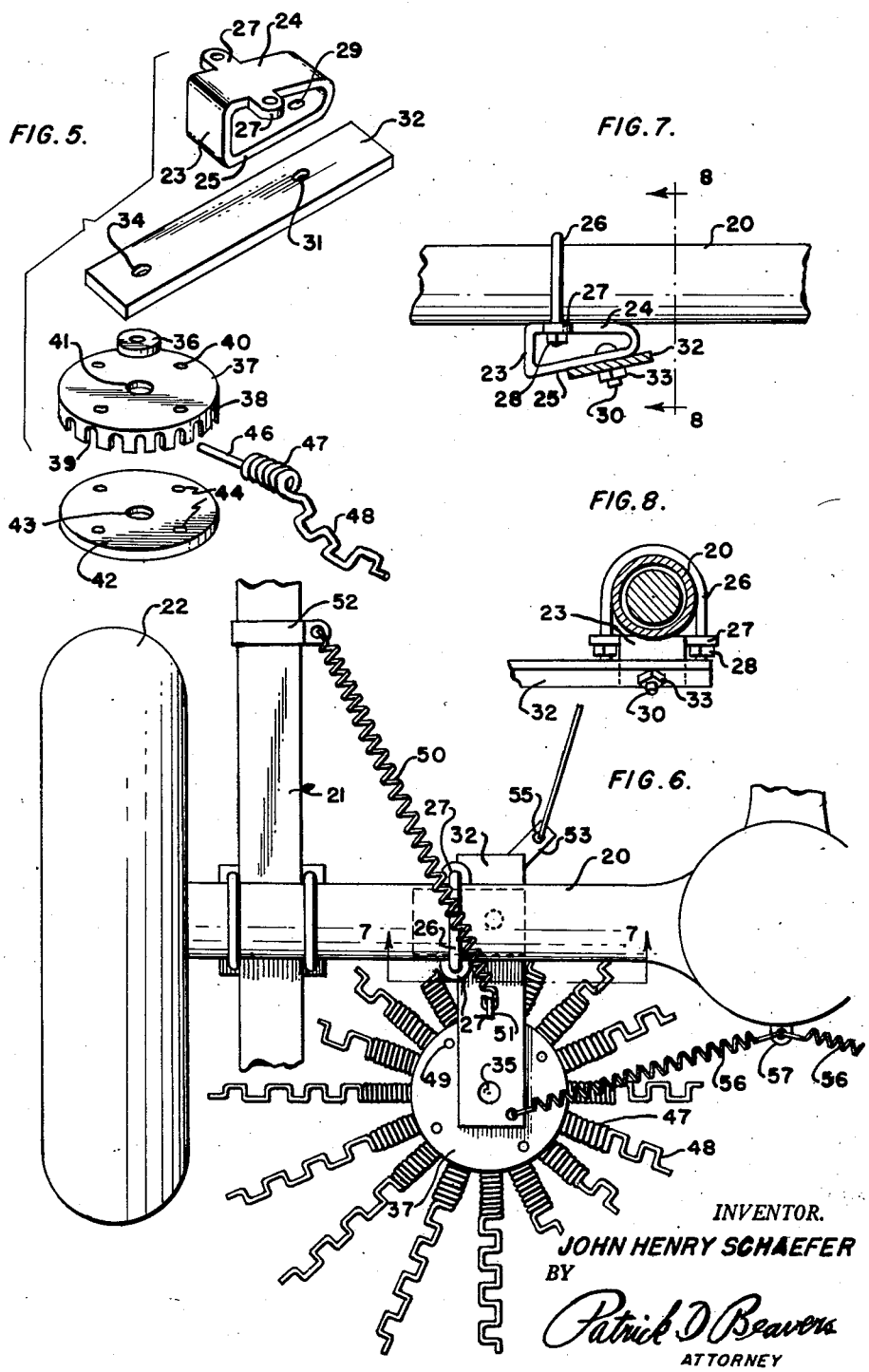
INVENTOR.
JOHN HENRY SCHAEFER
BY
Patrick D. Beavers
ATTORNEY Dec. 10, 1957   J. H. SCHAEFER   2,815,828
AUTOMATIC TRACTION DEVICE FOR AUTOMOBILES
Filed Sept. 16, 1955   3 Sheets-Sheet 3
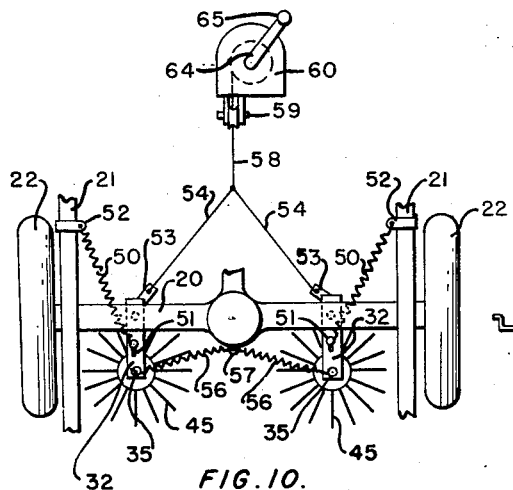
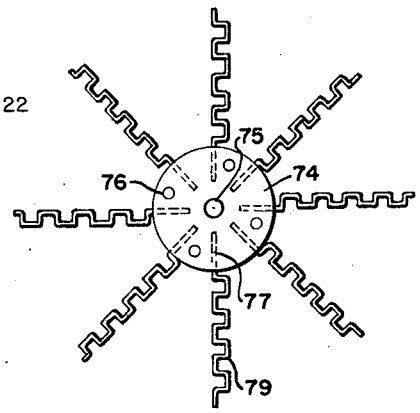
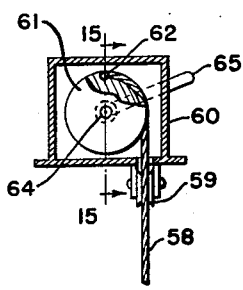
INVENTOR.
JOHN HENRY SCHAEFER
BY
*Patrick D. Beavers*
ATTORNEY

United States Patent Office 2,815,828
Patented Dec. 10, 1957

2,815,828

AUTOMATIC TRACTION DEVICE FOR AUTOMOBILES

John H. Schaefer, South St. Paul, Minn.

Application September 16, 1955, Serial No. 534,823

1 Claim. (Cl. 188—4)

This invention relates to improvements in traction increasing devices for the wheels of motor vehicles.

An object of this invention is to provide an automatic emergency traction increasing device for the wheels of motor vehicles that is mounted on the motor vehicle so that it may be moved into operative position by the operator of the motor vehicle from his seat in the motor vehicle without the necessity of jacking up the wheels of the motor vehicle.

Another object of the invention is to provide a traction increasing device that is especially adapted for use when snow and ice are on the ground.

With the above and other objects and advantages in view the invention consists of the novel details of construction, arrangement and combination of parts more fully hereinafter described, claimed and illustrated in the accompanying drawings in which:

Fig. 1 is an elevational view, partly in section, of an embodiment of the invention installed on the rear axle housing of a motor vehicle and in operative position;

Fig. 2 is a top plan view of Fig. 1;

Fig. 3 is a detailed fragmentary view of the plate for holding the traction increasing elements;

Fig. 4 is a perspective view of one of the traction increasing elements;

Fig. 5 is a perspective disassembled view of the mounting members for the traction increasing device;

Fig. 6 is a top plan view of the traction increasing device in inoperative position;

Fig. 7 is a transverse sectional view on the line 7—7 of Fig. 6;

Fig. 8 is a vertical sectional view on the line 8—8 of Fig. 7;

Fig. 9 is a schematic view of the traction increasing device in its entirety in inoperative position in relation to the rear axle housing of a motor vehicle;

Fig. 10 is a plan view of another form of a traction increasing device;

Fig. 11 is a transverse sectional view on the line 11—11 of Fig. 10;

Fig. 12 is a plan view of another form of a traction increasing device;

Fig. 13 is a perspective view of one of the traction increasing elements of Fig. 12;

Fig. 14 is a sectional view, partly in elevation, of the control lever for the traction increasing device; and Fig. 15 is a vertical sectional view on the line 15—15 of Fig. 14.

Referring more in detail to the drawings, wherein like parts are designated by like reference numerals, the reference numeral 20 is used to designate the rear axle housing of a motor vehicle which is supported by a spring 21 and has a ground engaging rear wheel 22 supported by an axle in the axle housing 20, in a conventional manner.

The traction device embodying the invention comprises a bracket 23 having a straight rear face 24 and an angularly disposed front face 25. A U-bolt 26 secures the bracket 23 to the axle housing 20 so that the straight face 24 of the bracket 23 is in engagement with the axle housing 20. The straight face 24 of the bracket 23 is provided with diametrically opposed, laterally extended apertured ears 27 to receive the ends of the U-bolt 26, and nuts 28 on the ends of the U-bolt 26 retains the bracket 23 in fixed relation to axle housing 20.

The angled face 25 of the bracket 23 is provided with an opening 29 to receive a bolt 30 which passes through an opening 31 in a bar 32 so that when a nut 33 is threaded on the bolt 30 the bar 32 is retained in fixed relation to the bracket 23 and depends therefrom at an angle conforming to the angled face 25 of the bracket 23.

The opposite end of the bar 32 is provided with an opening 34 to receive a bolt 35. Positioned on the bolt 35 in abutting relation to the undersurface of the bar 32 is a hub 36 of a disc 37 and the hub 36 retains the disc 37 in stable relation to the bolt 35. The disc 37 is provided with an annular flange 38, the peripheral edge of which is provided with a plurality of equally spaced serrations 39. The disc 37 is provided with a plurality of radially disposed openings 40 and a centrally disposed opening 41 to receive the bolt 35.

A second disc 42 is provided with a centrally disposed opening 43 whereby the disc is positioned on the bolt 35 and with four radially disposed openings 44. To prevent wear of the openings in the hub 36, disc 37 and disc 42 a heading is mounted in the openings in such members.

A heavy spring wire traction increasing element 45, as shown in Fig. 4, has a square or rectangular shaped straight portion 46, a coil portion 47 integral with one end of the portion 46 and a zig zag portion 48 integral with one end of the coil portion 47. As shown in Fig. 1, the zig zag portion 48 is arcuate in cross-section so that when the traction increasing element 45 is in engagement with the ground $a$ and the wheel 22, the curvature of the portion 48 will substantially conform to the transverse contour of the ground engaging wheel 22.

To assemble the traction increasing device, the portion 46 of the traction increasing element 45 is positioned in a serration 39 in the flange 38 on the disc 37. Thus, a plurality of traction increasing elements 45 equal in number to the serrations 39 is assembled in operative relation to each other, as shown in Fig. 3. The openings 40 in the disc 37 and the openings 44 in the disc 42 are aligned so that when bolts 49 are passed through the openings 40 and 44 and nuts are positioned on the bolts 49 the disc 37, traction increasing elements 45 and disc 42 are retained in rigid relation to each other and a nut 49a will retain these elements on the bolt 35.

A spring 50 is connected at one end to an eye bolt 51 secured to the bar 32 while the other end of the spring 50 is connected to a U-shaped bracket 52 mounted on the motor vehicle spring 21. A short plate 53 extends from the end of the bar 32 adjacent the end thereof connected to the bracket 23 and a control cable 54 is connected to the end of the plate 53 by means of an opening 55 therein.

In assembling the traction increasing device, a unit as has been previously described is connected to the axle housing 20 adjacent each rear ground engaging wheel 22 and each of the cables 54 is connected to a common control cable 58, Fig. 9.

The common control cable 58 is trained over a pulley 59 mounted on a control box 60 and the cable 58 is then connected to a disc 61 at 62. The disc 61 has a peripheral groove 63 to receive the cable 58 as shown in Figs. 14 and 15.

A shaft 64 rotatably mounts the disc 61 in the box 60 and a handle 65 permits the rotation of the disc 61 as becomes necessary.

When the shaft 64 is turned by means of the handle 65 the cables 54 will pull the bar 32 to the position shown in Fig. 6 and when retained in this position the traction increasing device will be in inoperative position.

When the handle 65 is released the springs 50 will move each traction increasing device into the position shown in Figs. 1 and 2.

Thus, when the box 60 is positioned adjacent the seat of the operator of a motor vehicle the handle 65 may be conveniently operated to permit the traction increasing device to move from inoperative position to operative position or vice versa.

In Figs. 10 and 11 another form of a traction increasing device is shown to comprise a pair of opposed discs 66 and 67. A centrally disposed opening 68 is positioned in each disc so that the same may be mounted on the bolt 35. Radially disposed openings are positioned in the discs 66 and 67 so that bolts 69 passing through the openings will clamp the straight ends 70 of a traction increasing element 71 therebetween.

The traction increasing element 71 includes a straight ground engaging portion 72 which is joined to the portion 70 by the angularly disposed portion 73 so that the traction increasing element 71 may be said to be Z-shaped in formation.

In Figs. 12 and 13 another form of traction increasing device is shown to include a pair of discs 74 having centrally disposed openings 75 to receive the bolt 35 and radially disposed openings to receive bolts 76 so that the square shaped straight ends 77 of the traction increasing element 78, Fig. 13, may be clamped between the discs 74.

The traction increasing elements 78 have a zig zag ground engaging portion 79 integral with one end of the portion 77 and the traction increasing element 78 may be said to be shaped in similar fashion to the traction increasing element 71.

It is to be understood that the traction increasing elements may be substituted for each other as desired and the number of such elements are not to be limited to the disclosure in the drawings since these are merely illustrative and not restrictive.

It is also believed that the construction and manner of operation of the invention will be clear to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A device of the character described comprising, in combination with a vehicle having an axle housing, conventional body supporting springs connected with said axle housing, and a pair of drive wheels, the provision of a traction-increasing device comprising a pair of triangular brackets, each attached to the underside of opposite end portions of said axle housing, an arm pivotally mounted on the lower side of each bracket, a tension spring interconnecting the outer portion of each arm with the adjacent conventional spring, an operating arm affixed to the inner end of each of the first-mentioned arms, cables for moving said first-mentioned arms against the action of said tension springs connected to the free ends of said operating arms, a pair of discs rotatably mounted on the underside of the outer portion of each of the first-mentioned arms, and a plurality of traction-increasing elements fixedly mounted between each of said discs and extending in circumferentially spaced relation outwardly from said discs, each of said elements comprising an inner end encompassed by said discs, an intermediate coiled portion, and an outer portion of zig zag contour when viewed in plan and of arcuate contour when viewed in elevation, said outer portion adapted to substantially conform with the shape of the bottom of its associated wheel and to provide additional traction for said wheel.

References Cited in the file of this patent

UNITED STATES PATENTS

| | | |
|---|---|---|
| 1,045,609 | Putnam | Nov. 26, 1912 |
| 2,241,923 | Ridgway | May 13, 1941 |
| 2,747,691 | Lakey et al. | May 29, 1956 |

FOREIGN PATENTS

| | | |
|---|---|---|
| 23,033 | Great Britain | July 29, 1909 |